United States Patent [19]
Meywald

[11] Patent Number: 4,909,494
[45] Date of Patent: Mar. 20, 1990

[54] VISE WITH CLAMPING JAWS

[76] Inventor: Günter Meywald, Rosenweg 5, 3548 Arolsen, Fed. Rep. of Germany

[21] Appl. No.: 257,382

[22] Filed: Oct. 14, 1988

[30] Foreign Application Priority Data

Oct. 14, 1987 [DE] Fed. Rep. of Germany ....... 3822408

[51] Int. Cl.$^{4}$ ............ B23Q 3/02
[52] U.S. Cl. ............ 269/135
[58] Field of Search ............ 269/134, 135, 239, 277, 269/278, 195; 279/123, 106

[56] References Cited

U.S. PATENT DOCUMENTS

| | | | |
|---|---|---|---|
| 2,587,025 | 2/1952 | Beck et al. | 269/134 |
| 2,760,535 | 8/1956 | Mertz | 269/195 |
| 2,811,771 | 11/1957 | Ericsson | 269/134 |
| 4,039,115 | 8/1977 | Randolph et al. | 228/44.5 |
| 4,771,999 | 9/1988 | Takeuchi et al. | 269/135 |

OTHER PUBLICATIONS

Western Electric, Technical Digest, No. 22, "Clamp", Behrens et al., Apr. 1971.

*Primary Examiner*—Robert C. Watson
*Attorney, Agent, or Firm*—Thomas & Kennedy

[57] ABSTRACT

A vise with clamping jaws (7,8), which are provided on the frame (1), makes possible a drawing-down motion with respect to a bearing surface (17) for the workpiece (16) when the gripping force is applied via a drive mechanism. The clamping jaws (7,8) have on their side facing toward the workpiece (16) a gripping edge (18,19) or gripping surface and, downwardly adjoining thereto, in each case an undercut surface (20,21), set back with respect to a vertical plane through the gripping edge or gripping surface. The clamping jaws (7,8) are mounted pivotably about horizontal pivot axes (14, 15), which are arranged underneath the bearing surface (17) for the workpiece (16) and on the side of the vertical plane facing toward the workpiece. Restoring springs are designed as tension springs (25,26) and thus for absorbing the gripping forces in the elastic range.

3 Claims, 2 Drawing Sheets

VISE WITH CLAMPING JAWS

FIELD OF THE INVENTION

The invention relates to a vise with clamping jaws, which are provided on the frame of the vise and execute a drawing-down motion with respect to a bearing surface for the workpiece when the gripping force is applied via a drive mechanism, and with restoring springs acting between frame and clamping jaws. During the gripping of workpieces having a more or less rectangular cross-section, in a vise essentially a horizontally acting gripping force is applied to the workpiece, the clamping jaws, which are in turn horizontally disposed, acting on the workpiece. A vise has, furthermore, a bearing surface for the workpiece and it has always been endeavored in gripping of the workpiece also to exert a downward draw on the workpiece, i.e. to press the workpiece in a vertical direction from up to down onto the bearing surface.

BACKGROUND OF THE INVENTION

A vise of the type described at the beginning which has two clamping jaws which can be moved via a drive mechanism is known from German Patent Specification No. 910,280. In addition, bearing jaws are also provided, on which the drive mechanism, which may be designed as a spindle, acts. Between each bearing jaw and each assigned clamping jaw there is provided an inclined plane, which is arranged and designed in such a way that the clamping jaws acting on the workpiece with parallel and vertically arranged gripping surfaces execute a certain motion downward in the direction of the bearing surface for the workpiece when the gripping force is applied, and thereby bring about the downward draw. During this gripping operation, the clamping jaws are displaced obliquely downward parallel to themselves. In connection with the inclined plane, restoring springs are provided, which guide the clamping jaws back into their initial position on the bearing jaws when the gripping force is removed. These restoring springs are often dimensioned comparatively weakly. In order to be able to use strong spring forces, the restoring of the clamping jaws is limited by a stop. The inclined plane and the restoring springs are surrounded by a covering seal in order to keep coolant and chips away from the inclined plane and thereby to ensure the downward draw. Under high gripping forces, the frame of the vise distorts in the elastic range. As a result, the parallelism of the gripping surfaces of the clamping jaws is lost and the workpiece is horizontally gripped relatively low, that is in the region of the bearing surface, while in the upper region it is held little or not at all. In this case as well, the downward draw is completely or partly lost.

SUMMARY OF THE INVENTION

The invention is based on the object of further developing a vise of the type described at the beginning in such a way that it is ensured with a simple design that the downward draw is preserved not only in the elastic gripping range, but also in the rigid gripping range —that is when the frame of the vise elastically flexes.

This is achieved according to the invention by the fact that the clamping jaws have on their side facing toward the workpiece a gripping edge or gripping surface and, downwardly adjoining thereto, in each case an undercut surface set back with respect to a vertical plane through the gripping edge or gripping surface, that the clamping jaws are mounted pivotably about horizontal pivot axes, which are arranged underneath the bearing surface for the workpiece and on the side of the vertical plane facing toward the workpiece, and that the restoring springs are designed as tension springs and thus for absorbing the gripping forces in the elastic range. The clamping jaws thus deliberately grip in two ranges, that is initially in the elastic range, which is determined by the compression of the restoring springs designed as tension springs, and then, once the forces of the tension springs have been used up, in a rigid range, in which the frame of the vise is elastically flexed. The downward draw already commences in the elastic range and is also preserved during the rigid gripping. The workpiece is held at the gripping edge or gripping surface during the entire gripping operation and does not come into contact with the set-back undercut surface. In the case of not very high workpieces, such as for example thin sheets, the gripping edge is formed within the undercut surface by the contact of the upper edge of the sheet. In the case of higher workpieces, in particular those which are higher than the extent of the clamping jaws, the gripping edge or gripping surface fulfils its function, to be precise in both clamping ranges. The clamping jaws are mounted in a very simple design pivotably about horizontal pivot axes, these axes being arranged, however, in such a way that the motion of the gripping edge or gripping surface has a displacement and force component providing the downward draw. With this new design it is possible to achieve a defined downward draw which accounts for approximately 30% of the gripping force applied by the drive mechanism. The undercut surface, which may be of plain or else curved or else stepped design, is in any case designed in such a way that it does not come into contact with the workpiece even during the elastic flexure of the frame in the rigid clamping range, in order that the gripping forces are transferred via the gripping edge or gripping surface in this state as well. In connection with the arrangement and design of this undercut surface, the clamping jaws must be mounted pivotably about horizontal pivot axes, which are arranged underneath the bearing surface for the workpiece and on the side of the vertical plane facing toward the workpiece. The forces and displacements may be divided by the dimensioning of the levers. The gripping edge or gripping surface may be provided at the upper end of the clamping jaws, the set-back undercut surface then adjoining downwardly. The vise is suitable for the gripping of high and also less high workpieces.

It is possible that the clamping jaws are mounted in displaceable bearings on the frame of the vise. The drive mechanism then engages between the two clamping jaws. It is also possible to mount one clamping jaw displaceably and one clamping jaw fixedly, the latter clamping jaw of course also being mounted pivotably in its fixed bearing.

The gripping edge or gripping surface may be arranged at the top of the clamping jaw, that is may lie or begin on the upper edge of the clamping jaw. It is also possible, however, that the gripping edge or gripping surface is arranged in the middle region of the part of the clamping jaw projecting upwardly beyond the bearing surface, and that an initial gripping surface adjoins upwardly. The initial gripping surface is in contact at the beginning of gripping in the elastic range. With increasing gripping pressure in the elastic range, the gripping edge or gripping surface then takes over its function, so that both the initial clamping surface and the set-back undercut surface are free from the workpiece.

The tension springs may be designed such that they can be set in their force in order to be able to fix or set the transition point from elastic gripping to rigid gripping.

The position of the gripping edge or gripping surface relative to the pivot axis is matched to the position and dimensioning of the tension springs. Here too, the lever principle applies. The tension springs are preferably designed as cup springs, allowing relatively great gripping forces to be realized in the elastic range with a small space requirement. But it is also by all means possible to use cylindrically wound helical springs. The tension springs may, finally, also be provided as tension cushions of a correspondingly flexible material and/or as hydraulic tension pads.

For forming the horizontal pivot axis, it is possible to provide a bearing bolt, which accordingly penetrates the parts and is mounted in the latter, so that the required pivoting motion for the downward draw and the elastic gripping range are realized.

The design of the undercut surface is matched to the travel of the extension of the tension springs. It is generally sufficient to provide the angle of the free surface in an order of magnitude of about 2°.

The clamping jaws may be provided with legs engaging in a T-shaped groove in the frame, which legs are arranged such that they can be pushed past each other at various distances and the upper free edge of which forms with the frame the respective displaceable bearing. This makes it possible also to grip very narrow or thin workpieces, that is for example an upright sheet, the bearing of the right-hand clamping jaw being to the left of the bearing of the left-hand clamping jaw when in the gripping state.

The invention is illustrated and described further with reference to preferred exemplary embodiments. In the drawing:

DETAILED DESCRIPTION

Figure 1:
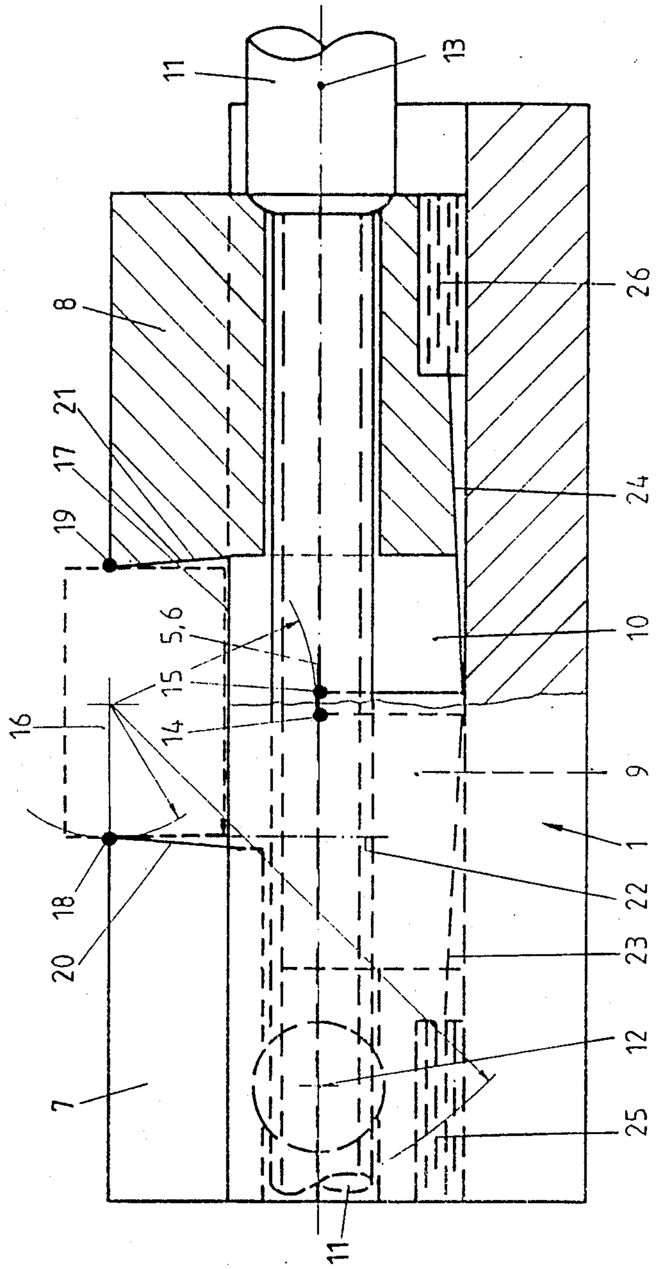
FIG. 1 shows a view of the vise in a first embodiment in partial section.

The vise represented in FIG. 1 has a frame 1 which has a T-shaped groove 2 (FIG. 2) passing essentially along its length. The frame 1 thus has an approximately U-shaped cross-section, the members 3 and 4 of which in each case project inward at the upper end, guide and bearing surfaces 5,6 being formed here.

The vise has two mutually aligned clamping jaws 7 and 8, which both have such a cross-section that they are arranged displaceably in the T-shaped groove 2. The clamping jaw 7 has two legs 9, which can engage underneath the T-shaped groove 2 and come into contact with the guide and bearing surfaces 5 formed there. The clamping jaw 8 has corresponding legs 10, which are arranged with a greater distance with respect to each other than the legs 9, so that the legs 9 and 10 can be pushed past each other when gripping very thin or narrow workpieces. The legs 10 may come into contact with the guide and bearing surfaces 6. The two clamping jaws 7 and 8 are connected to each other by a drive mechanism, the essential component of which is a spindle 11, which passes through both clamping jaws 7 and 8, the clamping jaws 7 and 8 being mounted pivotably about horizontal axes 12 and 13 with respect to the spindle 11 in a known way, either by a spherical joint or by another bearing surface. This pivoting capability refers to the pivoting of the clamping jaws 7 and 8 with respect to the spindle 11.

Figure 2:
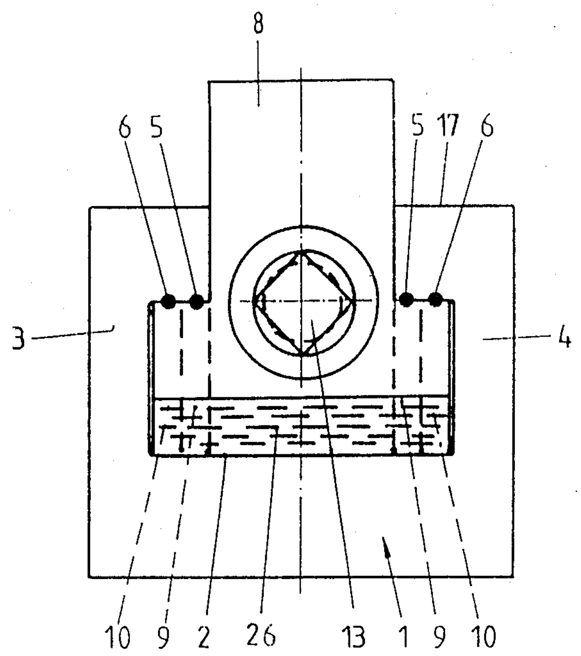
FIG. 2 shows a front view of the vise according to FIG. 1.

In addition, the clamping jaws 7 and 8 may also, however, be pivotable with respect to the frame 1, to be precise in the following way:

The free ends of the legs 9 and 10 form horizontal pivot axes 14 and 15, to be precise by contact with the guide and bearing surfaces 5 and 6, displaceable pivot bearings being formed thereby, depending on the length or width of the workpiece to be gripped. A workpiece 16 is indicated by broken lines in FIG. 1. It rests with its underside on a bearing surface 17 formed on the frame 1 and has contact with gripping edges 18 and 19, which are arranged here at the upper end of the clamping jaws 7 and 8. FIG. 1 shows the state in which both clamping jaws 18 and 19 come into contact for the first time with the side wall of the workpiece 16, that is to say the gripping operation begins in the elastic range. The gripping edges 18 and 19 may also be designed as gripping surfaces, that is they have a certain areal extent, being expediently of curved design. The gripping edges 18 and 19 are adjoined downwardly by set-back undercut surfaces 20 and 21, which are set back by about 2° with respect to vertical plane$ through the gripping edges 18 and 19. The undercut surfaces 20 and 21 may be designed as plane surfaces, curved or stepped. What is essential is the geometric arrangement of the gripping edges 18 and 19 relative to the pivot axes 14 and 15. Thus, the pivot axis 14 must firstly be provided underneath or, in any event, in the bearing surface 17, in order that comparatively thin workpieces, for example sheets, can also be gripped reliably and a downward draw also occurs in this case. Above all, however, the pivot axis 14 of the clamping jaw 7 must be arranged to the right of a vertical plane 22 which is defined by the gripping edge 18. The same of course also applies correspondingly to the design of the clamping jaw 8. It is thus ensured that both clamping jaws 7 and 8 execute a circular motion when they are pivoted about the pivot axes 14 and 15 with the gripping edges 18 and 19, as is indicated in FIG. 1. This produces at each gripping edge 18 and 19 a horizontal component and a vertical component, the horizontal component ultimately representing the gripping force on the workpiece 16, while the vertical component determines the downward draw of the workpiece 16 onto the bearing surface 17. In order that the clamping jaws 7 and 8 can pivot about the pivot axes 14 and 5 during the gripping operation, the clamping jaws 7 and 8 are provided on their underside with recesses 23 and 24, extending in wedge form, restoring springs designed as compression springs being provided, which in the case of the exemplary embodiment of FIGS. 1 and 2 are designed as pressure cushions 25 and 26. These pressure cushions 25 and 26 may be formed from flexible material, for example a plastic or the like. The arrangement of wound steel springs or cup springs is also possible in this place. The compression springs realized by the pressure cushions 25 and 26 serve not only for returning the clamping jaws 7 and 8, with regard to their pivoting motion, into the initial position represented in FIG. 1, but are dimensioned considerably more strongly in order to be able to absorb the gripping forces in the elastic range.

In the gripping of a workpiece 16, the latter is firstly rested on the bearing surface 17, the clamping jaws 7 and 8 being spaced a greater distance apart than corresponds to the width of the workpiece 16. By turning the spindle 11 of the drive mechanism, the two clamping jaws 7 and 8 approach each other, until their gripping edges 18 and 19 are set against the side surfaces of the workpiece 16. This state is represented in FIG. 1. The complete unit of drive mechanism, spindle 11 and clamping jaws 7 and 8 is freely displaceable in the groove 2 of the frame 1, so that the clamping jaws 7 and 8 can set themselves according to the position of the workpiece 16. On further activation of the drive mechanism, or turning of the spindle 11, the elastic gripping range begins, in which the clamping jaw 7 is pivoted about the gripping edge 18 counterclockwise and with compression of the pressure cushion 25, until the pivot axis 14 has assumed a constant position with the guide and bearing surface 5 and the angle at the recess 23 has been used up, so that the clamping jaw 7 has wedged in the frame 1. In this case, the undercut surface 20 is still set back by a smaller angle with respect to the vertical plane 22, so that the gripping edge 18 continues to hold the workpiece 16. The same applies correspondingly to the clamping jaw 8. With compression of the pressure cushions 25 and 26, the elastic gripping range ends and a further turning of the spindle 11 leads to a further gripping in the rigid gripping range. In this case, now only the frame 1 can flex under very great gripping forces, the dimensioning and arrangement of the undercut surfaces 20 and 21 being chosen such that a contact of the undercut surfaces 20 and 21 with the workpiece is also still avoided in this range, so that the workpiece 16 also continues to be horizontally gripped by the gripping edges 18 and 19 and the downward draw on the workpiece 16 is also preserved during the gripping in the rigid range. After the corresponding machining of the workpiece 16, the gripping force and the drawing-down force are reduced, the rigid range and the elastic range being passed through successively. At the end of the gripping operation, and thus before release of the workpiece, the parts again assume the relative position as that represented in FIG. 1.

Figure 3:
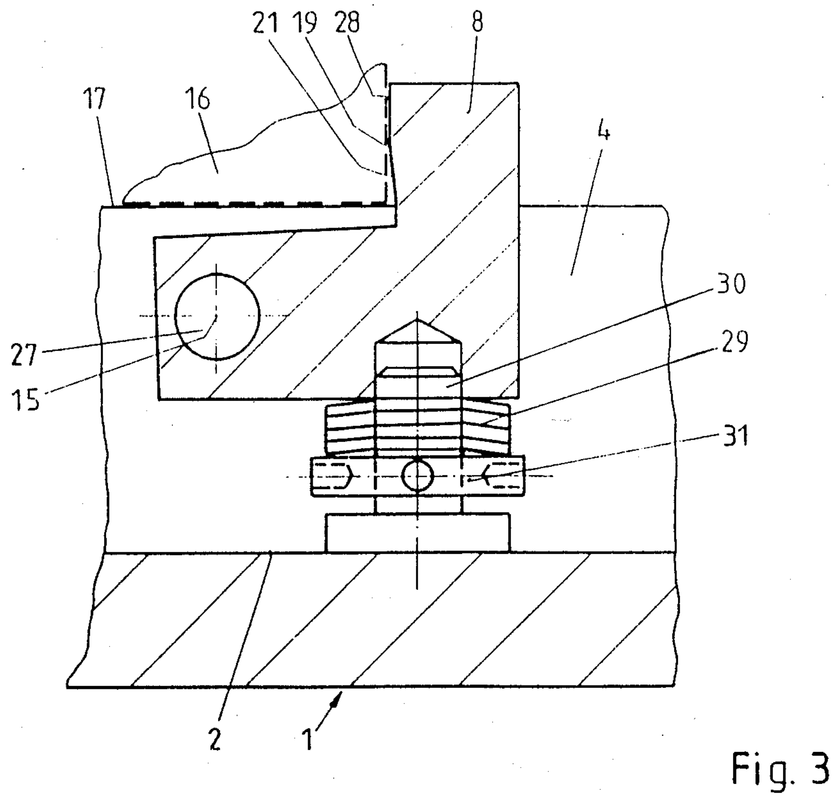
FIG. 3 shows the representation of a clamping jaw in the case of another embodiment of the vise.

FIG. 3 shows only one clamping jaw 8, which is fixedly mounted on the frame, pivotably about the pivot axis 15. The not-shown clamping jaw 7 of this exemplary embodiment is provided with a drive mechanism, in order to approach the clamping jaw 8 or move away from it. The pivot axis 15 is realized here by a bolt 27, which passes through the legs 3 and 4 of the frame 1, a fixed pivotal mounting of the clamping jaw 8 being indicated, in contrast to the displaceable mounting according to the exemplary embodiment of FIGS. 1 and 2. Here too, the pivot axis 15 is arranged underneath the bearing surface and on the side facing toward the workpiece 16 of a vertical plane through the gripping edge 19. Downwardly adjoining the gripping edge 19, which is provided in the middle region of the projecting part of the clamping jaw 8, is the undercut surface 21, while there upwardly adjoins an initial gripping surface 28, which comes into contact with the workpiece 16 at the beginning of gripping. The tension springs are designed here as cup springs, or as an assembly of cup springs 29, which are mounted here on a bolt 30. A bearing ring 31 is provided, which is mounted rotatably on the bolt 30 in a thread, so that in this way the transition point between the elastic gripping range and the rigid gripping range can be set. The bolt 30 is provided on the frame 1. The embodiment according to FIG. 3 is suitable in particular for thinwalled workpieces 16, for example sheets. Wherever the thickness of the sheet is less than the distance of the gripping edge 19 from the bearing surface 17, a fictitious gripping edge forms in the region of the undercut surface 21, the downwardly adjoining part of the undercut surface still continuing however to fulfil its purpose. In this case as well a downward draw occurs reliably.

List of Reference Numerals

1=frame
2=groove
3=member
4=member
5=guide and bearing surface
6=guide and bearing surface
7=clamping jaw
8=clamping jaw
9=leg
10=leg
11=spindle
12=axis
13=axis
14=pivot axis
15=pivot axis
16=workpiece
17=bearing surface
18=gripping edge
19=gripping edge
20=undercut surface
21=undercut surface
22=vertical plane
23=recess
24=recess
25=pressure cushion
26=pressure cushion
27=bolt
28=initial gripping surface
29=cup spring
30=bolt
31=bearing ring

I claim:

1. A vise comprising:

a frame defining an approximately inverted T-shaped groove forming a slot open along the upper surface of the frame and including downwardly facing bearing surfaces formed on opposite sides of the slot, a pair of clamping jaws each including legs of approximately inverted T-shape that correspond to the shape of said T-shaped groove and which are slidably positioned in the T-shape groove of said frame for moving the clamping jaws toward each other to engage a work piece positioned on said frame between said clamping jaws, said clamping jaws each having a gripping surface positioned above said frame for engaging a work piece positioned on said frame, the legs of said clamping jaws each including pivot surfaces juxtaposed the bearing surfaces of said frame and positioned beneath the gripping surface of each clamping jaw, compressible supports arranged for tilting the clamping jaws about their pivot surfaces to urge the gripping surfaces of said clamping jaws toward the work product, and spindle means for drawing said clamping jaws together along said frame to move the gripping surfaces of the clamping jaws toward compressive engagement with the work product and tilting the clamping jaws about their respective pivot surfaces as the pivot surfaces slide against the downwardly facing bearing surfaces of the frame and compress the compressible supports, whereby the clamping jaws draw the work piece toward the frame.

2. The vise as claimed in claim 1 and wherein the legs of said clamping jaws are shaped so that they can be moved into overlapped relationship with respect to each other.

3. A vise including a frame with an elongated downwardly facing bearing surface, a pair of clamping jaws mounted to said frame and movable along said frame on opposite sides of a work piece to be clamped by said clamping jaws, each of said clamping jaws including a leg member having an upwardly facing pivot surface juxtaposed said bearing surface, each of said clamping jaws including gripping surfaces positioned above said frame for engaging a work piece positioned between the clamping jaws, a compressible support mounted between the leg member of each clamping jaw and said frame and arranged for tilting its clamping jaw about its pivot surface and urging the gripping surfaces of the clamping jaws toward each other, and spindle means for drawing said clamping jaws toward each other along said frame and moving the gripping surfaces of the clamping jaws into engagement with a work piece positioned therebetween, whereby as the clamping jaws are drawn into engagement with the work piece the clamping jaws are progressively tilted about their respective pivot surfaces and compress the compressible supports and tend to draw the work piece toward the frame.

* * * * *